United States Patent
Walter et al.

(10) Patent No.: US 9,809,392 B2
(45) Date of Patent: Nov. 7, 2017

(54) DEVICE AND METHOD FOR TRANSPORTING CONTAINERS IN A CONTAINER TREATMENT SYSTEM

(71) Applicant: KRONES AG, Neutraubling (DE)

(72) Inventors: Ralf Walter, Zeitlarn (DE); Konrad Senn, Regensburg (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/917,204

(22) PCT Filed: Aug. 13, 2014

(86) PCT No.: PCT/EP2014/067300
§ 371 (c)(1),
(2) Date: Mar. 7, 2016

(87) PCT Pub. No.: WO2015/036197
PCT Pub. Date: Mar. 19, 2015

(65) Prior Publication Data
US 2016/0214799 A1     Jul. 28, 2016

(30) Foreign Application Priority Data
Sep. 13, 2013    (DE) ........................ 10 2013 218 403

(51) Int. Cl.
*B65G 37/02*      (2006.01)
*B65G 54/02*      (2006.01)
*B65G 43/10*      (2006.01)

(52) U.S. Cl.
CPC ............. *B65G 37/02* (2013.01); *B65G 43/10* (2013.01); *B65G 54/02* (2013.01); *B65G 2201/0244* (2013.01); *B65G 2811/0673* (2013.01)

(58) Field of Classification Search
CPC ........ B65G 37/02; B65G 43/10; B65G 54/02; B65G 2811/0673; B65G 2201/0244
(Continued)

(56) References Cited

U.S. PATENT DOCUMENTS 5,551,348 A    9/1996   Matsumoto
5,722,326 A *   3/1998   Post ........................ B60L 13/04
                                                       104/281

(Continued)

FOREIGN PATENT DOCUMENTS

CN        1275115 A     11/2000
DE        4133114 A1     4/1993
(Continued)

OTHER PUBLICATIONS

German Search Report for Application No. 102013218403.4, dated May 13, 2014.
(Continued)

*Primary Examiner* — Mark A Deuble
(74) *Attorney, Agent, or Firm* — Marshall, Gerstein & Borun LLP (57) ABSTRACT

A transport device for transporting containers in a container treatment system which has a first container treatment unit for a process step and a second container treatment unit for the process step, the transport device having at least one receiving point for the containers, at least one delivery point for the containers, a transport track which connects the at least one receiving point, the at least one delivery point, the first container treatment unit, and the second container treatment unit, and at least one transport element for transporting a container, the transport element being movably arranged on the transport track. The transport track and the at least one transport element are designed such that the at least one transport element can be guided from a receiving (Continued)

point to a delivery point in an individually controllable manner.

15 Claims, 6 Drawing Sheets

(58) Field of Classification Search
USPC .......................................................... 198/619
See application file for complete search history.

(56) References Cited

U.S. PATENT DOCUMENTS

| | | | |
|---|---|---|---|
| 5,906,262 A * | 5/1999 | Miki | ............... B65G 54/02 |
| | | | 198/341.02 |
| 6,692,196 B1 | 2/2004 | Simm et al. | |
| 8,459,442 B2 | 6/2013 | Morimoto et al. | |
| 2003/0158615 A1 | 8/2003 | Weber et al. | |
| 2003/0190223 A1 | 10/2003 | Peiter | |
| 2003/0230941 A1 * | 12/2003 | Jacobs | ............... B60L 15/38 |
| | | | 310/12.19 |
| 2013/0026005 A1 | 1/2013 | Senn | |
| 2013/0158615 A1 | 6/2013 | Mahajan et al. | |
| 2013/0160922 A1 | 6/2013 | Zwilling | |
| 2013/0313072 A1 * | 11/2013 | van de Loecht | ....... B65G 54/02 |
| | | | 198/464.1 |
| 2014/0331888 A1 * | 11/2014 | Wernersbach | ........ B60L 13/006 |
| | | | 104/282 |

FOREIGN PATENT DOCUMENTS

| | | |
|---|---|---|
| DE | 4244351 A1 | 7/1993 |
| DE | 29913237 U1 | 12/2000 |
| DE | 60108264 T2 | 12/2005 |
| DE | 102010018153 A1 | 10/2011 |
| DE | 102010021733 A1 | 12/2011 |
| DE | 102010045661 A1 | 3/2012 |
| EP | 1645340 A1 | 4/2006 |
| EP | 2088026 A2 | 8/2009 |
| EP | 2407417 A1 | 1/2012 |
| JP | H0551087 A | 3/1993 |
| JP | 2010132405 A | 6/2010 |
| WO | WO-02/34666 A1 | 5/2002 |
| WO | WO-2011/131704 A1 | 10/2011 |

OTHER PUBLICATIONS

International Search Report for International Application No. PCT/EP2014/067300, dated Jan. 12, 2015.

* cited by examiner

DEVICE AND METHOD FOR TRANSPORTING CONTAINERS IN A CONTAINER TREATMENT SYSTEM

CROSS-REFERENCE TO RELATED APPLICATION

The present application is the US national phase of International Application No. PCT/EP2014/067300, filed Aug. 13, 2014, which application claims priority to German Application No. DE 102013218403.4, filed Sep. 13, 2013. The priority application, DE 102013218403.4, is hereby incorporated by reference.

FIELD OF THE INVENTION

The present invention relates to a device and a method for transporting containers, in particular bottles or cans, in a system for treating the containers.

PRIOR ART

Containers, such as bottles, cans, etc. are in container treatment systems treated in one or several successive process steps. The process steps or work steps are there generally performed in separate treatment units which can be assembled, for example, as modules of a common system concept. To reduce costs for procurement and operation of the system, interfaces for controlling the system, for media supply or the like, are there commonly standardized to facilitate the combination of treatment units of different types and/or production capacities. A container treatment system for plastic bottles, for example, made of polyethylene terephthalate (PET), polypropylene (PEP), etc., can comprise, for example, a heating device for heating the preforms, a stretch-blow-molding device for expanding and stretching the preforms into plastic bottles, a cleaning device, a labeling device, a filling device, a sorting device, a packaging device, as separate treatment units that are configured in a modular manner. The individual treatment units performing subsequent process steps are there in prior art generally connected in series, where one or more transport devices are responsible for transporting containers from the treatment units to the respective downstream treatment units.

Performance of successive process steps by the separate treatment units of the system and transportation among the treatment units therefore corresponds to the known principle of conveyor belt processing, in which a continuous flow of containers to be treated through the treatment units arranged in series is achieved by way of appropriate control processes with respect to the process time of the individual process steps and/or the number of containers per unit of time transported from one treatment unit to the next treatment unit. In systems known in prior art, transportation of the containers among the treatment units is often realized by way of a plurality of separate transport elements in the form of carriers which receive the containers or preforms in suitable holding devices, for example, specially shaped gripping elements, at a receiving point, transport them through a series of consecutive treatment units, and ultimately deliver them at a delivery point. In order to subsequently be able to reuse the transport elements, they must again be returned to the receiving point by way of a suitable separate transport device. The transport elements there remain unused on the return path which is relatively long, depending on the size and configuration of the container treatment system. In addition to the return path being unused in terms of process technology, also the total number of transfer elements must be increased according to the length of the return path to ensure a sufficient density of transport elements in the process path formed by the treatment units.

Due to the arrangement of the individual treatment units in series along the process path, even the failure of a single treatment unit, for example, due to a necessary maintenance operation, will lead to a standstill of the entire system. Moreover, the one treatment unit with the lowest throughput of containers per unit time determines the maximum achievable throughput of the entire system. Furthermore, prior art for container treatment systems only defines an overall protection zone, so that the entire system must be switched off for safety reasons when already a single treatment unit is to be serviced and/or repaired. Valuable production time is thereby lost.

The present invention is therefore based on the object to provide an improved transport system for transporting containers in a container treatment system which overcomes the drawbacks mentioned above and is able to ensure in particular continuous production even upon failure of individual treatment units. Very generally, the object is to provide an efficient and fault-tolerant transport system.

DESCRIPTION OF THE INVENTION

The above object is satisfied by a transport device for transporting containers in a container treatment system which has a first container treatment unit for a process step and a second container treatment unit for the process step, with
 at least one receiving point for containers,
 at least one delivery point for containers,
 a transport track which connects the at least one receiving point, the at least one delivery point, the first container treatment unit, and the second container treatment unit; and
 at least one transport element for transporting at least one container, said transport element being movably arranged on the transport track, where the transport track and the at least one transport element are designed such that the at least one transport element can be guided from a receiving point to a delivery point in an individually controllable manner.

Transport devices are presently and hereinafter understood to be conveyor devices which comprise transport elements for the containers and are conveyed in a closed circuit. However, this does not exclude that at least a section of the path of the transport device does not form a closed circuit.

Containers within the meaning of the invention are in particular beverage bottles, but also other containers for food, medicines, toiletries, detergents or the like, such as cans, glass bottles and other glass containers with lids, packaging based on cardboard or composites, Tetra Packs, or the like. Containers made of plastic also comprise intermediate products, in particular preforms for stretch-blow-molding the containers. Furthermore, containers within the meaning of the invention are also understood to be packs with several containers.

The first container treatment unit and the second container treatment unit can be a heating device for heating preforms, a stretch-blow-molding device for the production of plastic containers by way of a stretch-blow-molding process, a cleaning device, a labeling device, a filling device, a sorting device, a packaging device, a sterilizing device, an inspection device a tempering device, a cooling device, a coating device, a buffering device, etc., or a combination of several of said devices. According to the invention, however, the first container treatment unit executes the same process step as the second container treatment unit, where the process step executed can also be composed of a sequence of process steps, in particular when the container treatment units are configured as a combination of several devices. The first and the second container treatment unit can each be configured as a modular treatment unit that can be exchanged individually. This results in a flexible system concept with which different products or containers can be produced at optimum capacity utilization, also with frequent product change-over. Production downtimes during product change-over can also be minimized.

Although the first container treatment unit and the second container treatment unit execute the same process step or work step, the first and the second container treatment unit can be designed differently. In particular a process time and/or a throughput of containers per unit time of the first container treatment unit can differ from a process time or a throughput of the second container treatment unit.

It is understood that the present invention also comprises container treatment systems with more than two container treatment units, each of which executes the same process step. By using two or more container treatment units, each of which executes the same process step, a homogeneous or a diverse redundancy of the container treatment system is achieved, whereby the container treatment system can be operated in a fault-tolerant manner with respect to the respective process step.

According to the invention, the transport device comprises at least one receiving point for containers and at least one delivery point for containers. The number of delivery points can there differ from the number of receiving points. The containers are at a receiving point transferred by a feed conveyor to the transport elements described below. A transport element there accommodates exactly one a container. In specific embodiments, however, individual or all transport elements can be designed in such a manner that they can accommodate more than one container. One feed conveyor is generally provided for every receiving point. The feed conveyor can be configured in particular as a transfer star in the form of a star wheel or as a conveyor belt. Since the transport elements can be controlled individually, firstly, the speed of a transport element accommodating a container can be adapted to a rotation or conveying speed of the feed conveyor, and secondly, the number of transport elements per unit time guided to the receiving point can be controlled in dependence of the respectively number of containers currently fed.

The containers are at a delivery point transferred from the transport elements to a removal conveyor. The removal conveyor can there like the feed conveyor be configured in particular as a transfer star in the form of a star wheel or as a conveyor belt. In its simplest form, the transport device can be configured such that all containers which are received by the transport elements at a given receiving point are after their treatment by the first container treatment unit or the second container treatment unit again transferred to a delivery point. The present invention, however, also relates to significantly more complex arrangements in which, for example, the container, after treatment in the first container treatment unit or the second container treatment unit, can be subjected to further process steps in other container treatment units and/or individual containers can depending on their treatment condition, for example discharged as rejects, again be supplied to the first or the second container treatment unit or an alternative delivery point.

According to the invention, the transport track of the transport device connects at least one receiving point, the at least one delivery point, the first container treatment unit, and the second container treatment unit. The at least one receiving point and the at least one delivery point can be considered as end points of a process path along which the first container treatment unit and the second container treatment unit are arranged. The first container treatment unit and the second container treatment unit can according to the invention be arranged in various ways (see below).

The transport device according to the invention furthermore comprises at least one transport element for transporting one or more containers and is movably arranged at the transport track. The transport device can in particular comprise a plurality of identically designed transport elements which can be moved individually and independently of each other along the transport track. The number of transport elements on the transport track is there in principle arbitrary and limited only by the length of the transport track, as long as at least two transport elements are present. For receiving the at least one container at a receiving point and delivering the container to a delivery point, the at least one transport element can be configured with a suitable holding device, for example, in the form of a gripping element. The gripping element can there be designed as being passively or actively actuatable. Gripping elements in particular or gripping a neck portion of the containers in a positive-fit or force-fit manner, for example, by way of so-called neck handling of plastic bottles are conceivable, where the container being gripped in a positive-fit manner is mounted rotatable about its longitudinal axis in the gripping element. In addition, the gripping element can be pivotable and/or adjustable in height.

The at least on transport element can be designed as a runner, a puck, a carriage, a shuttle or the like, which is moved by interaction with the transport track. Each transport element can there—as needed—be accelerated, decelerated, or at times also be stopped completely on the transport track. By controlling the transport element individually, a variable distance-time profile can be realized for each transport element. Furthermore, the at least one transport element can comprise a unique identification unit, for example, in the form of a bar code, a readable memory chip, an alphanumeric code printed on, glued on and/or engraved, etc., where it is enabled by one or more suitable identification detection devices along the transport track that the transport element passing the respective identification detection device is identified. The identification unit of the transport element can in particular be used for selectively guiding the transport element, for example, to a specific delivery point.

The shape of the transport track is basically arbitrary. The transport track can in particular be substantially closed, whereby substantially closed means that the transport track enables at least one closed path for the transport elements. In one embodiment, this can be realized by providing a return path as a section of the transport track, where the return path allows returning the at least one transport elements from the at least one delivery point to the at least one receiving point. The transport track, however, can also at least in part be designed as being open in such a way that a section of the path of the transport track is designed as a dead end for the at least one transport element, where returning the at least one transport element can be enabled by reversing the direction of movement. Such a dead end can in particular terminate at one of the delivery points.

The transport track can comprise a guide rail and/or a guide channel for guiding the at least one transport element or the transport track. Accordingly, the at least one transport element can comprise a complementary guide channel, a complementary guide element, for example, a guide pin and/or one or more suitably arranged guide rollers which run, for example, by use of a wheel flange, on the guide rail of the transport track. A plurality of alternative embodiments, for example, by way of sliding bearings, is there conceivable. Providing a guide rail on the transport track enables low-friction guiding of the at least one transport element along the transport track. Moreover, the transport track can comprise a running surface along which respective support elements, for example, support rollers, can roll or slide. Furthermore, the transport track can comprise at least one sensor for determining the position of the at least one transport element along the transport track. In particular, by regular and periodic arrangement of sensors along at least a section of the transport track, the position of a transport element can be determined in this section of the transport track. The sensor can be configured as an optical sensor, an electrical sensor, an electromagnetic sensor, or a mechanical sensor, where the position of the transport element in the region of the sensor can be measured e.g. by measuring a light reflection on a suitable reflector element of the transport element, by induction of an electromagnetic signal due to the motion of the transport element, by a change in electrical resistance of the sensor by utilizing a magnetoresistive effect, for example, due to the magnetic flux caused by the motion of a transport element comprising a magnetic reference element, or by local pressure measurement due to the weight of the transport element. Alternatively or additionally, the at least one transport element can comprise a signal unit generating a position signal. The position signal can then be located by suitable detectors in the region of the transport device to determine the position of the transport element along the transport track. The signal unit of the transport element can be designed in particular as an RFID chip.

According to the invention, the transport track and the at least one transport element are designed such that the at least one transport element can be guided in an individually controllable manner from a receiving point to a delivery point. This means that the at least one transport element comprises at least one response element which by way of mechanical and/or electromagnetic interaction with interaction elements disposed along the transport track experiences a force with which the transport element can be accelerated and thereby moved. By selectively actuating the response element of a particular transport element and/or one or more interaction elements in a limited area of the transport track, this application of force can be limited to a particular transport element, whereby the transport element can be guided along the transport track individually and independently of other transport elements.

According to a further development, the transport device comprises a first receiving point and a second receiving point and a first delivery point and a second delivery point, wherein the transport track connects the first container treatment unit and the second container treatment unit in series, and wherein the transport track comprises:

a first process path, which connects the first receiving point via the first container treatment unit to the first delivery point, and a return path for the transport element, wherein at least a section of the return path is formed as a second process path which connects the second receiving point via the second container treatment unit to the second delivery point.

The transport track is therefore substantially closed, where the return path for the transport element connects the first delivery point to the first receiving point. At least as part of the return path, a second process path is provided, at which the process step described above can be performed on the containers by way of the second container treatment unit. For this, the second process path connects a further second receiving point via the second container treatment unit to a further second delivery point. Connecting via a container treatment unit presently and hereinafter means that a section of the transport track passes through the respective container treatment unit or past it such that the respective process step can be performed by the container treatment unit on containers transported by the transport elements. It is for this also possible that a container transported by a transport element to the container treatment unit can be temporarily transferred to the container treatment unit to be returned to the same or another transport element after the process step has been executed.

According to the invention, the transport track connects the first container treatment unit and the second container treatment unit in series, so that transport elements which are moved on a closed path along the transport track without reversal of the direction of movement can pass both the first and the second container treatment unit. The transport track therefore comprises a closed path along which a transport element consecutively passes the first receiving point, the first container treatment unit, the first delivery point, the second receiving point, the second container treatment unit and the second delivery point. The container treatment system can there be configured such that containers in the same treatment state are by feed conveyors at the first and the second receiving point transferred to the transport elements and are in the first or the second container treatment unit, respectively, subjected to the same process step in order to subsequently in the new treatment state again be conveyed away at the first or the second delivery point, respectively. By use of identical container treatment units for the first and the second container treatment unit, in particular with regard to their process time and/or throughput of containers per unit of time, a second process path being equivalent to the first process path can be formed along the return path and double the overall throughput of the container treatment system. The necessary return transport of the transport elements from the first delivery point to the first receiving point is thereby replaced by the second process path, the return path of which is likewise replaced by the first process path. The number of transport elements used in the transport device as compared to the provision of two separate transport devices each for a single process path can be reduced considerably, thereby saving installation costs and operating costs. The transport elements used are thereby better utilized and transport path can be saved.

According to a further development, the transport track can further comprise a compensation path connecting the first delivery point to the first receiving point and/or the second delivery point to the second receiving point. The connections required for this can be realized by use of two or more track switches for the transport track. The position of a track switch can be controlled by way of a track switch control unit in dependence of the operating state of the first and/or the second container treatment unit and/or the measured position of one or more transport elements along the transport track. The track switch can in particular in the event of a failure of one of the two container treatment units be switched such that the transport elements are via the compensation path guided past the respective container treatment unit. The compensation path there bridges the remaining operational process paths so that the entire container treatment system can despite the failure of a container treatment unit indeed continue operation, though at a reduced throughput.

Moreover, each track switch can be switched in a time-dependent manner such that the flow of transport elements along the two process paths can be adapted to the respective process time and/or the respective throughput of the respective container treatment unit. The transport elements and the track switches of the transport device can be controlled by a central control unit such that a backup upstream of a container treatment unit with a lower throughput or the container treatment unit running empty at a higher throughput can be avoided.

In order to be able to compensate not only predetermined differences in throughput of the container treatment units, but also to be able to compensate for failure of any container treatment unit, at least a section of the compensation path can be configured such that the transport element can be guided in either direction. For this purpose, the transport track can comprise at least six track switches: Two for discharging transport elements from the main circuit formed by the two process paths to the compensation path, two for re-introducing transport elements from the compensation path to the main circuit and two track switches connecting the respective outflow and inflow path with the section of the compensation path which allows guiding the transport elements in either direction. Due to the use of such a compensation path being operable in either direction, separate formation of a compensation path for each of the two process paths can be avoided In the configuration described, the entire container treatment system can therefore be operated in a fault-tolerant manner with respect to the failure of a container treatment unit.

In a further embodiment, the first and the second container treatment unit are operated such that the transport element can be supplied selectively to the first or the second container treatment unit, where the transport track comprises:

a first transport path connecting the at least one receiving point via a first track switch to the first and the second container treatment unit, and a return path for the transport element.

The arrangement of the first and the second container treatment unit thereby corresponds to a parallel circuit in which a transport element is by controlling the position of the first track switch selectively supplied to the first or the second container treatment unit. As already described above, the position of the first track switch can be controlled in dependence of a process time and/or a throughput of the first and/or the second container treatment unit and/or a position of one or more transport elements along the transport track or a resulting specific density of transport elements in a section of the transport track, respectively. Returning the transport elements from the first and the second container treatment unit can be effected via a common return path with at least one further track switch or via separate return paths. The treated containers can there be transported away to a common delivery point of the common return path or to separate delivery points of separate return paths. Alternatively, transfer of the containers from the transport element to the respective container treatment unit is also conceivable, where the treated container is subsequently received by a further transport device and transported to further container treatment units and/or removal conveyors. Like with the series arrangement described above, fault-tolerance for the entire container treatment system can also with this development be achieved by controlling the position of the first track switch, in that the first track switch is upon failure of one container treatment unit set such that the transport elements are guided to the other still operational container treatment unit.

According to a further development, the transport track can further comprise a second transport path that connects the first and second container treatment unit via a second track switch to the at least one delivery point. The second track switch therefore again collects the flow of transport elements coming from the first and the second container treatment unit and guides the overall flow via the second transport path to the at least one delivery point. In particular each transport element can in this configuration be guided selectively via the first track switch, the first container treatment unit, and the second track switch to the delivery point or via the first track switch, the second container treatment unit, and the second track switch to the delivery point.

In the above-described developments for the transport device according to the invention, the first container treatment unit can comprise a first protection zone and the second container treatment unit a second protection zone separate from the first protection zone. The protection zone of a machine presently and hereinafter denotes the hazard area around the machine in which electric shock, dangerous active or moving parts of the machine, high or very low temperatures, toxic materials, electromagnetic radiation, ionizing radiation or similar dangerous elements pose threat to operating personnel when the machine is in operation. For maintenance, troubleshooting, programming and the execution of tests, however, it may be necessary that personnel must enter the machine protection zone. In order to reduce the danger to personnel, a machine protection zone therefore comprises respective devices for reducing the energy supply to the machine to a safe level, for example, in the manner of an electric shock protection, which can be activated by the personnel when needed. A protection zone of a machine can be defined in particular by a housing of the machine, where the housing ensures protection against intervention by the operating personnel in the machine area. The protection zones can be designed to be accessible for above-mentioned general maintenance work. The access can take there be formed by an entry corresponding to the type of required access, for example, in the form of a safety door, a safety flap, a safety window or the like. Furthermore, the entry can be provided with a sensor element or switch element which detects when the entry is opened and as a consequence switches off the drive or the drive supply to the machine via an automatic cut-off device. Any possible risk of injury to the operating personnel can thereby be effectively prevented.

In order to avoid having to stop the entire container treatment system for pending maintenance, troubleshooting or adjustment of an individual container treatment unit, the device according to the invention provides for separate protection zones for each container treatment unit. It is thereby and by individual control of the transport elements and of the track switches described above possible to perform maintenance work at a container treatment unit while the container treatment system continues production as a whole by way of the remaining containers treatment units. This increases the degree of efficiency of the overall system and unnecessary downtime can be prevented. A section of the transport device corresponding to the protection zone can in particular prior to maintenance be run empty by selectively activating the transport elements located therein.

According to one development, the transport element and at least a section of the transport track can be formed such that the transport elements can in the area of the section of the transport track be moved by way of magnetic force, preferably in interaction with the transport track. The respective section of the transport track can in particular be equipped with a magnetic linear drive, for example, in the form of an asynchronous linear motor. For this purpose, the respective section of the transport track is equipped with a plurality of electrical windings in the form of individually actuatable electromagnets. In order to create magnetic interaction between a transport element and the individually actuatable electromagnets of the transport track, the transport element can be fitted with one or more permanent magnets or non-switching electromagnets or iron cores. In this embodiment, the transport element is embodied as a passive transport element which is moved by interaction with the electromagnetic alternating fields generated by the individually actuatable electromagnets of the transport track. The at least one permanent magnet or non-switching electromagnet or iron core, respectively, of the transport element therefore forms the above-mentioned response element, while the individually actuatable electromagnets of the transport track form the above-mentioned interaction elements. A locating unit is preferably arranged on the transport track when using passive transport elements to determine the position of at least one transport element and preferably all the transport elements and to pass it to a controller of the electromagnets of the transport track. The locating unit can be realized in particular by the above-described sensors. The strength of current through the electrical windings of the transport track can be adjusted automatically by the controller depending on the power demand by the transport elements to be moved. By individually controlling the strength of current through individual windings of the transport track, the transport element can further be accelerated, decelerated or moved at a uniform predetermined speed.

In an alternative embodiment, the transport element is as an active transport element provided with electrical windings which can apply the magnetic alternating fields necessary for the drive. Accordingly, the section of the transport track is provided with permanent magnets or non-switching electromagnets. Both the electrical energy necessary for the drive as well as the signals necessary for the controller can there be transmitted by induction transmission to the individual transport elements. The controller can therefore be located decentralized on the individual transport elements or also be centrally housed in a separate control unit. In an alternative thereto, the necessary electrical energy can be transmitted to the transport elements via a lead disposed along the transport track. Furthermore, a combination of a configuration of the transport element as an active transport element is conceivable or with a transport track with individually controllable electromagnets.

Besides the above-described section of the transport track designed as a magnetic route, the transport track can further comprise at least one section of the path along which the transport element can be moved at a uniform speed. The section of the path can for this purpose comprise a drive device in the form of a conveyor belt, a conveyor chain, or the like. By combining sections of the path with a magnetic drive and sections of the path with a mechanical drive, the installation costs of the transport device can be reduced.

The transport element can in a further development be supported fully magnetically or in part magnetically and in part mechanically or fully mechanically at the transport track. With fully magnetic support, the above-described section of the transport track is configured as a magnetic levitation track, where electrical windings are provided in the transport track and/or the transport elements and cause magnetic levitation of the transport element above the transport track. This allows the friction between the transport element and the transport track to be reduced to a minimum. With in part magnetic and in part mechanical support, the transport element can additionally comprise one or more support elements, for example, in the form of support rollers and/or guide rollers. The additional support elements there roll or slide on a running surface of the transport track. With fully mechanical support, the transport device can be supported solely by the at least one support element described. Additionally or alternatively, the support can also be effected pneumatically, where the transport track is in the respective section configured as an air suspension track. With pneumatic support, minimum friction arises between the transport element and the transport track, just like with fully magnetic support.

According to one development, the transport device can further comprise a control device, in particular a process computer, for controlling the at least one transport element. The control device can there be realized by a central control unit and/or by decentralized control units arranged on the transport elements. The one or more control units can there be designed such that they control or regulate both the electrical windings of the transport track and/or the transport elements individually as well as control the position of the one or more track switches along the transport track. As described above, in particular the position of one or more transport elements along the transport track can be determined for controlling and/or regulating the electromagnets of the transport track and/or the transport elements. Moreover, the strength of current through the respective electrical windings can be controlled in dependence of the force required, this means in dependence of a loading state of a transport element and/or a desired acceleration/deceleration or speed of the transport element. Furthermore, the one or more control units can be designed as (a) programmable logic control unit(s) PLC.

In a further development, the control device can be configured to control the transport element in dependence of a first process time and/or a first throughput of the first container treatment unit and/or of a second process time and/or a second throughput of the second container treatment unit. For this purpose, the first process time and/or the first throughput and/or the second process time and/or the second throughput can be determined by way of one or more sensors attached to the first and the second container treatment unit, respectively, and transmitted to the control device by way of signal transmission, either by lines or by radio. The at least one transport element can in combination with the signals transmitted by the container treatment units and the positions determined of one or more transport elements subsequently be controlled as described above such that a backup upstream of a container treatment unit or running it empty can be avoided. For this purpose, the control device can based on the positions of the transport elements determined continuously monitor a density of transport elements along a predetermined section of the path of the transport track or a flow of transport elements to a predetermined location of the transport track and guide the at least one transport element along the transport track by individually activating the electrical windings according to a predetermined density and/or a predetermined flow.

The present invention also provides a container treatment system, with at least one first container treatment unit for a process step and a second container treatment unit for the process step, which comprises the transport device described in the above developments.

The above object is also satisfied by a transport method for transporting containers in a container treatment system, which comprises a first container treatment unit for a process step and a second container treatment unit for the process step, where the transport method comprises the steps of:

a transport element receiving at least one first container at a first receiving point for transporting containers, transporting the first container by way of the transport element along the transport track from the first receiving point to the first or the second container treatment unit, transporting the first container by way of the transport element along the transport track from the first or the second container treatment unit to a first delivery point, the transport element delivering the first container at the first delivery point, and returning the transport element to the first receiving point, wherein the transport element is guided in an individually controlled manner from the receiving point to the delivery point.

The same variations and developments that have been described above in the context of the transport device according to the invention can also be applied to the transport method for transporting containers in a container treatment system. Receiving and/or delivering the first container at the first receiving point and at the first delivery point, respectively, can In particular be realized by moving a gripper element of the transport element in a mechanically and/or electrically controlled manner. Transporting the first container by way of the transport element along the transport track can be done by moving the transport element due to magnetic interaction between a response element of the transport element and one or more interaction elements of the transport track. As described above, the transport element can by individual actuation of electrical windings in the transport track and/or on the transport element be controlled individually along the transport track, i.e. in particular from the receiving point to the delivery point. The individual controller of the transport element can there be implemented according to one of the variants described above. in particular the speed of the transport element when receiving or respectively delivering the first container can be adapted to a rotation speed or a belt speed of a respective feed conveyor or removal conveyor, respectively.

According to one development, the first and the second container treatment unit are arranged in parallel along the transport track, and the first container is supplied by way of the transport element selectively to the first or the second container treatment unit. As described above, in particular the position of a track switch can for this be controlled such that the transport element with the first container is supplied to the first or the second container treatment unit.

In an alternative development, the first container is transported from the first receiving point to the first container treatment unit, and returning the transport element to the first receiving point comprises: the transport element receiving at least one second container at a second receiving point, transporting the second container by way of the transport element along the transport track from the second receiving point to the second container treatment unit, transporting the second container by way of the transport element along the transport track from the second container treatment unit to a second delivery point, and the transport element delivering the second container to the second delivery point.

As described above, the production capacity of the container treatment system can be significantly increased and ideally doubled in that the transport element, after delivering the first container at the first delivery point being unloaded, receives a second container when the transport element is returned, in that the second container is supplied to the second container treatment unit, and in that the second container is delivered at the second delivery point after the second container treatment unit has treated the second container. The number of transport elements required in comparison to a container treatment system with a similar production capacity can also be reduced and/or transport path can be saved.

In another development, the transport element can in dependence of an operating state and/or a throughput of the second container treatment unit be returned directly from the first delivery point to the first receiving point. The operating state of the second container treatment unit can there be classified as being fully operational, operational at a reduced capacity, or stopped. Directly returning the transport element, meaning without passing the transfer element along the second receiving point, the second container treatment unit and/or the second delivery point, can be done—as described above—by way of a suitable compensation path and by appropriately controlling one or more track switches for discharging and/or re-introducing the transport element. Equivalently, the transport element can also in dependence of an operating state and/or a throughput of the first container treatment unit be returned directly from the second delivery point to the second receiving point. A container treatment system can by combining both options be provided which can be operated in a fault-tolerant manner with respect to the failure of an individual container treatment unit.

BRIEF DESCRIPTION OF THE DRAWINGS

Further features and embodiments as well as advantages of the present invention are by way of example illustrated below using the drawings. It is understood that the embodiments do not exhaust the scope of the present invention. It is further understood that some or all features described hereafter can also be combined with each other in different ways.

DETAILED DESCRIPTION OF PREFERRED EMBODIMENTS

Figure 1:
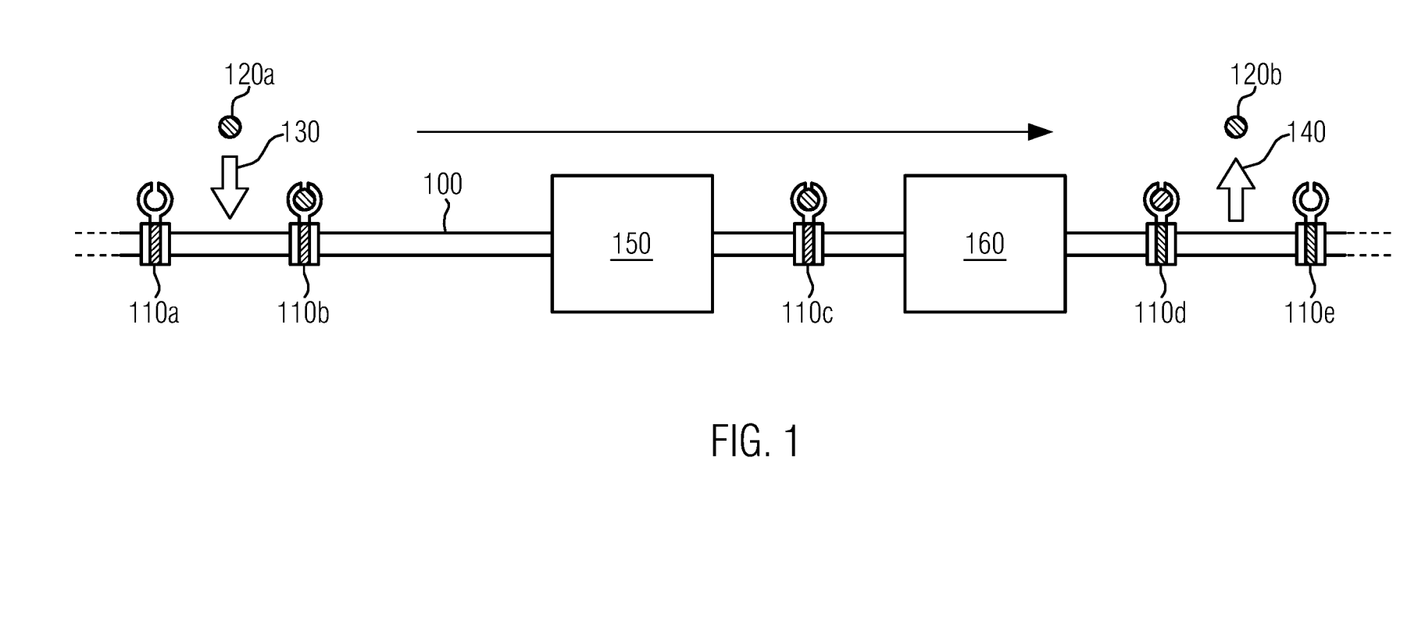
FIG. 1 represents a schematic diagram of a basic example of a transport device according to the present invention for the case of a series arrangement of the first and the second container treatment unit.

FIG. 1 shows a schematic diagram of a basic example of a transport device for transporting containers in a container treatment system with a first container treatment unit for a process step and a second container treatment unit for the process step. Transport track 100 shown schematically connects receiving point 130 via first container treatment unit 150 and second container treatment unit 160, which are by way of example presently arranged in series, to delivery point 140. An unloaded transport element 110a receives a container 120a at receiving point 130. Container 120a is subsequently by way of now loaded transport element 110b transported along transport track 100 to first container treatment unit 150. Transport element 110c transports the container from the first container treatment unit to second container treatment unit 160. Transport element 110d transports the container from the second container treatment unit to delivery point 140 where container 120b is delivered to an outfeed conveyor. Transport element 110e is subsequently again unloaded and can be returned to the receiving point (presently not shown).

FIG. 1 is a representation of several snapshots 110a to 110e of a single transport element at various times during the course of the process. Containers 120a and 120b illustrated are therefore the same container. The figure shows a transport track that leads through the first and the second container treatment unit. In an alternatively thereto, however, as described above, the transport track can also lead past the container treatment units such that the containers led past can either be treated on the transport element or for treatment in the container treatment unit be transferred to the latter. In addition to the transport element presently illustrated, a plurality of transport elements can be located along the transport track, where each individual transport element can be individually controlled by a controller. By continuously supplying transport elements to the receiving point, a continuous flow of loaded transport elements along the process path can be obtained.

Since the first container treatment unit and the second container treatment unit each perform the same process step, a container transported by a transport element is treated only in one of the two container treatment units. For this purpose, the transport track can comprise, for example, one bypass path each for the first and the second container treatment unit which is connected via track switches to the process path of the transport track, and via which individual transport elements upstream of one of the two container treatment units can be discharged in a controlled manner and can again be filtered in downstream of the container treatment unit. Alternatively thereto, the first and the second container treatment unit can be controlled such that individual transport elements can pass through the container treatment unit without treatment of the containers carried along, thereby performing gap treatment. In the simplest case, when using identical container treatment units, for example, every second transport element can pass first container treatment unit 150 without treatment in order to have the container carried along be treated in second container treatment unit 160. Accordingly, the containers treated in the first container treatment unit can pass the second container treatment unit without treatment. For this purpose, each transport element can comprise a read/write memory in which a treatment state of the container carried along can be stored. Accordingly, the first and the second container treatment unit can comprise a reading unit for reading out the memory, so that treatment can be performed in dependence of the treatment state. A control unit (presently not shown) can there control the plurality of transport elements such that running a container treatment unit empty or a backup of transport elements upstream of a container treatment unit can be prevented.

Figure 2:
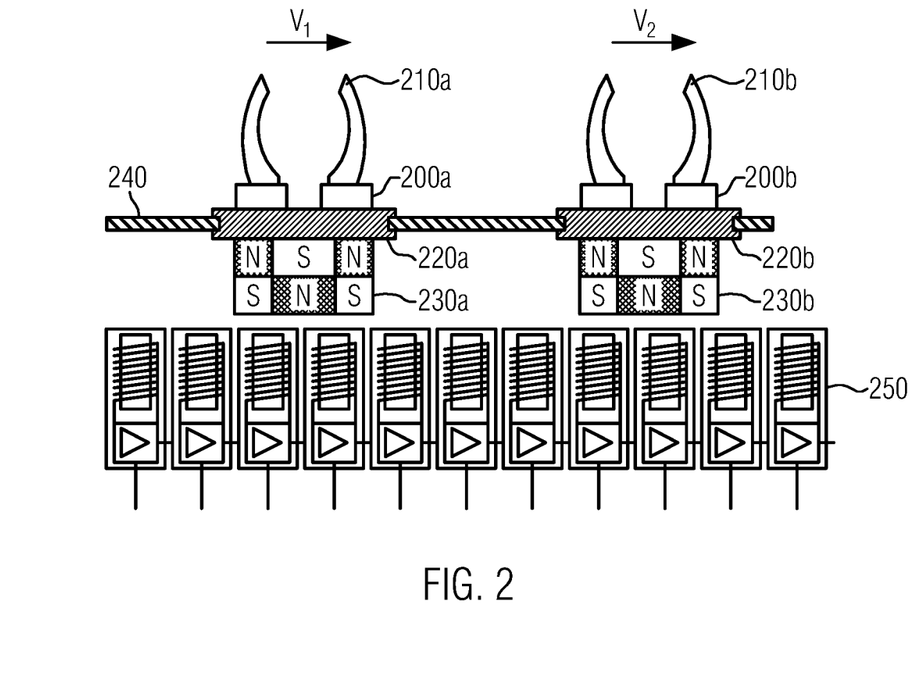
FIG. 2 represents an exemplary embodiment of the at least one transport element and of the interaction elements of the transport track.

FIG. 2 by way of example illustrates two transport elements 200a and 200b. However, the present invention is not restricted to the specific embodiments of the transport elements presently illustrated, but is applicable to any type of transport element as long as it can be guided individually along a transport track in a controllable manner. Transport elements 200a and 200b presently shown can be guided by a guide rail 240 along the transport track. The transport elements in this particular embodiment are supported by sliding bearings 220a and 220b on guide rail 240. The Figure further shows two gripping elements 210a and 210b by way of which the transport elements can receive the containers.

The drive of the passive transport elements presently illustrated is effected by magnetic interaction between response elements 230a and 230b, respectively, of the transport elements and a plurality of electrical windings 250 along the transport track. Electrical windings 250 can there be actuated individually and as electromagnets individually have the polarity be reversed. By interaction of the magnetic fields of the electromagnets with the permanent magnets of the transport elements presently illustrated, the transport elements experience an action of force which with suitable control of electromagnets 250 leads to an acceleration, deceleration, or a uniform motion of the transport elements along guide rail 240. Presently shown response elements 230a and 230b of the transport elements are composed of three permanent magnets arranged alternately and perpendicularly to the guide rail, where the width of the center permanent magnet corresponds approximately to the distance between two adjacent electrical windings of the transport track, and the width of the outer permanent magnets each corresponds to half the distance of the adjacent electrical windings. With alternating polarity of adjacent electromagnets in the transport track, maximum force can thereby be exerted upon the response element along the guide rail. By individually actuating electromagnets 250, transport elements 200a and 200b can be moved at different speeds $V_1$ and $V_2$ along guide rail 240.

Figure 3:
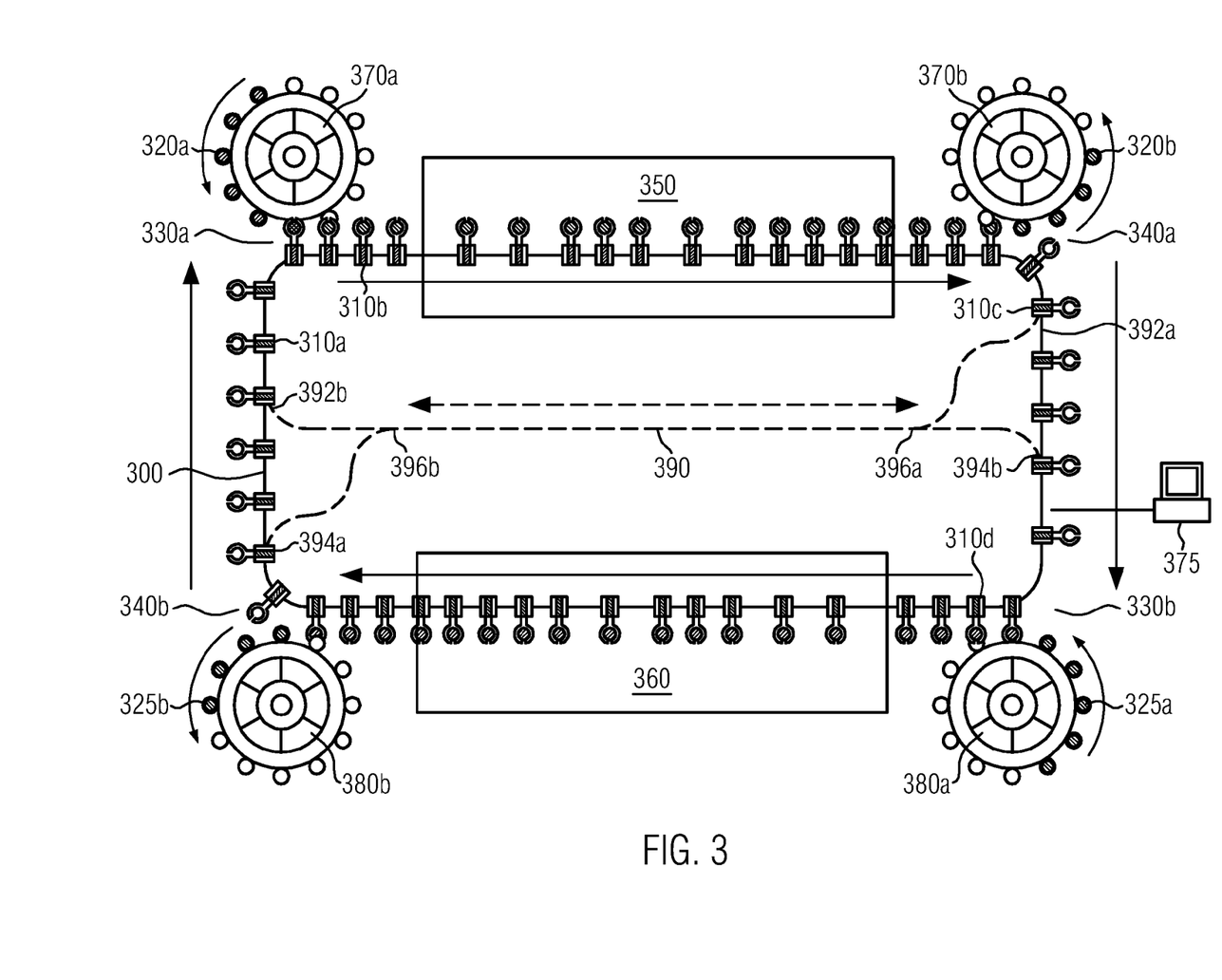
FIG. 3 represents a schematic diagram of an example of a transport device according to the present invention for the case in which a section of the return path is formed as a second process path.

FIG. 3 represents a schematic diagram of an example of a transport device according to the present invention for the case in which a return path is at least in part formed as a second process path. Transport track 300, now illustrated as being closed, connects first receiving point 330a via first container treatment unit 350 to first delivery point 340a and second receiving point 330b via second container treatment unit 360 to second delivery point 340b. The return path from first delivery point 340a to first receiving point 330a is therefore formed as the second process path which is composed of second receiving point 330b, second container treatment unit 360 and second delivery point 340b. The feed conveyors and the removal conveyors are presently by way of example illustrated as first in-feed star wheel 370a, second in-feed star wheel 380a, first out-feed star wheel 370b and second out-feed star wheel 380b. The figure shows a plurality of transport elements 310a to 310d in different loading conditions along transport track 300. The initially unloaded transport element 310a receives first container 320a from first in-feed star wheel 370a. Now being loaded, transport element 310b transports the first container along the first process path through first container treatment system 350 where the first container is subjected to treatment by the process step. The transport element then delivers first container 320b to first out-feed star wheel 370b and is as an unloaded transport element 310c as part of the return path supplied to second in-feed star wheel 380a. Transport element 310d there receives a second container 325a and transports the second container along the second process path, which is now a part of the return path, to second container treatment unit 360 where the second container is subjected to treatment by the same process step which the first container has been subjected to in first container treatment unit 350. Container 325b now treated is by the transport element again delivered at second outfeed star wheel 380b. A circuit thereby closes in which two process paths with identical container treatment units are passed in opposite directions.

In order to prevent a backup of transport elements upstream of a container treatment unit or a container treatment unit from running empty, the transport device presently illustrated comprises an additional compensation path 390 for the case that a process time and/or a throughput of treated containers of the first and the second container treatment unit differs, in particular when one of the two container treatment units must be stopped due to necessary maintenance, repair or cleaning work. Compensation path 390 is there connected to the transport track via track switches 392a and 394a for discharging unloaded transport elements from the respective infeed paths of the container treatment unit that operate slower or are at a standstill. The discharged containers can via a connection to the compensation path via track switches 392b and 394b again be filtered into the respective inflow path of the container treatment units that operate faster or are not at a standstill. The two connection sections to the respective infeed path are there via track switches 396a and 396b connected to the center section of compensation path 390, which allows guiding transport elements in either direction. Programmable logic control unit 375 presently illustrated controls the speeds of the individual transport elements by individually actuating the transport elements and the interaction elements of the transport track and by controlling the positions of the track switches of the compensation path. This control can be effected based on the position of the transport element being determined in dependence of the densities of transport elements at predetermined sections of the path as well as of the throughput of transport elements through the first and the second container treatment unit.

Figure 4:
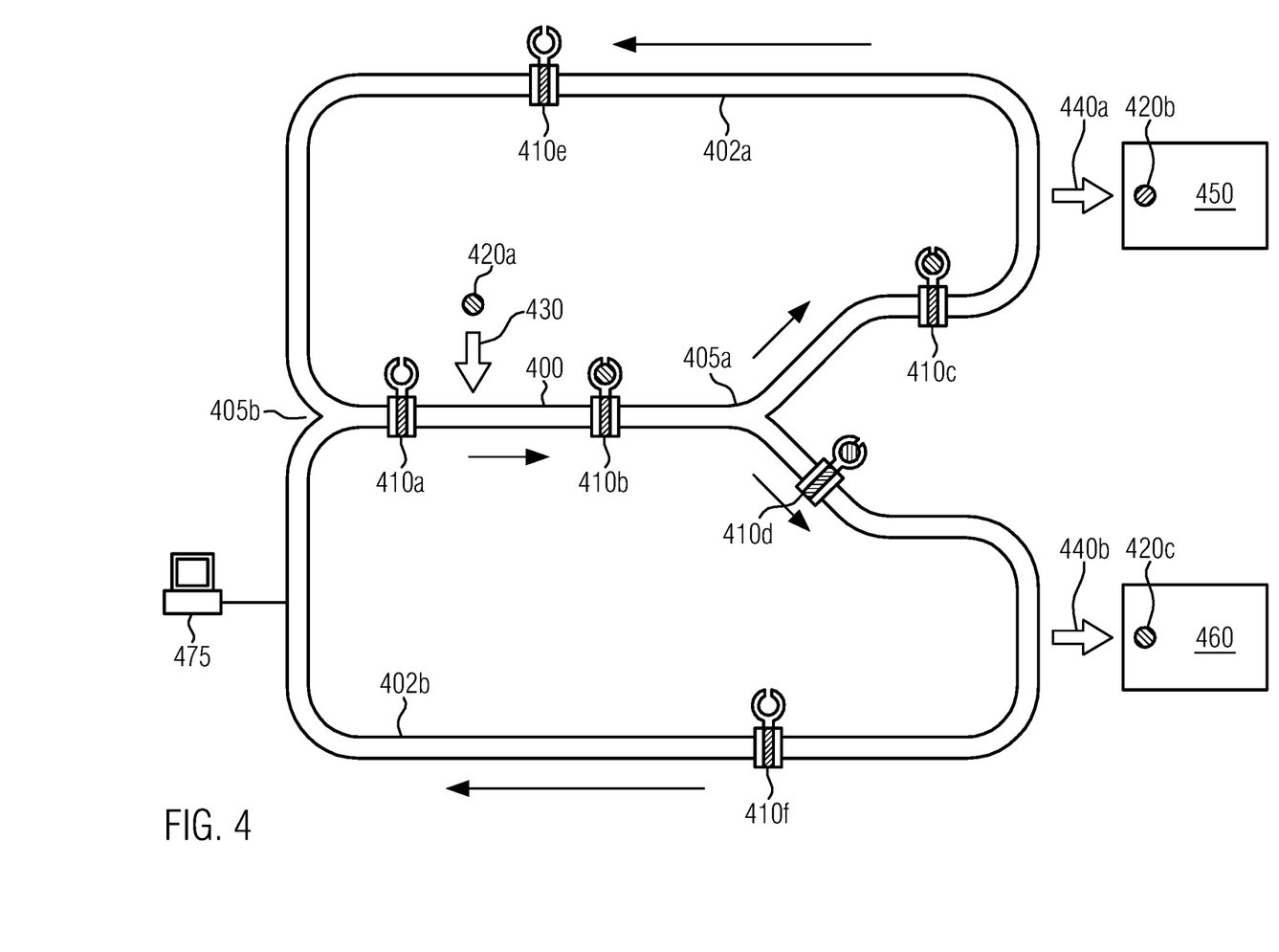
FIG. 4 represents a schematic diagram of an example of a transport device according to the present invention for the case in which the transport elements are supplied selectively to the first or the second container treatment unit and transferred to the latter.

FIG. 4 represents a schematic diagram of an example of a transport device according to the present invention for the case in which the transport elements are supplied selectively to first container treatment unit 450 or second container treatment unit 460. For this purpose, the transport track comprises first track switch 405a the position of which can be controlled by programmable logic control unit 475 in dependence of a process time and/or a throughput of the two container treatment units and the positions of the transport elements along transport track 400. The configuration presently shown of the transport device comprises two separate return paths 402a and 402b for the two container treatment units. The two return paths are again united via a second track switch 405b.

Initially unloaded transport element 410a receives container 420a at receiving point 430. The now loaded transport element 410b transports the container to first track switch 405a. Depending on the position of the track switch, transport element 410c or 410d, respectively, subsequently supplies the container either to first delivery point 440a or second delivery point 440b. Container 420b is at first delivery point 440a transferred to first container treatment unit 450. Container 420c is at second delivery point 440b transferred to second container treatment unit 460. After the treatment of container 420b or 420c, respectively, the container can by a delivery device of the first or the second container treatment unit, respectively, be supplied to a further transport device, and via the latter to further process steps. Unloaded transport element 410e or 410f, respectively, is subsequently guided via respective return path 402a or 402b, respectively, back to second track switch 405b. Like the configuration shown in FIG. 3, the configuration shown in this Figure can also be operated in a fault-tolerant manner with respect to the failure of an individual container treatment unit.

Figure 5:
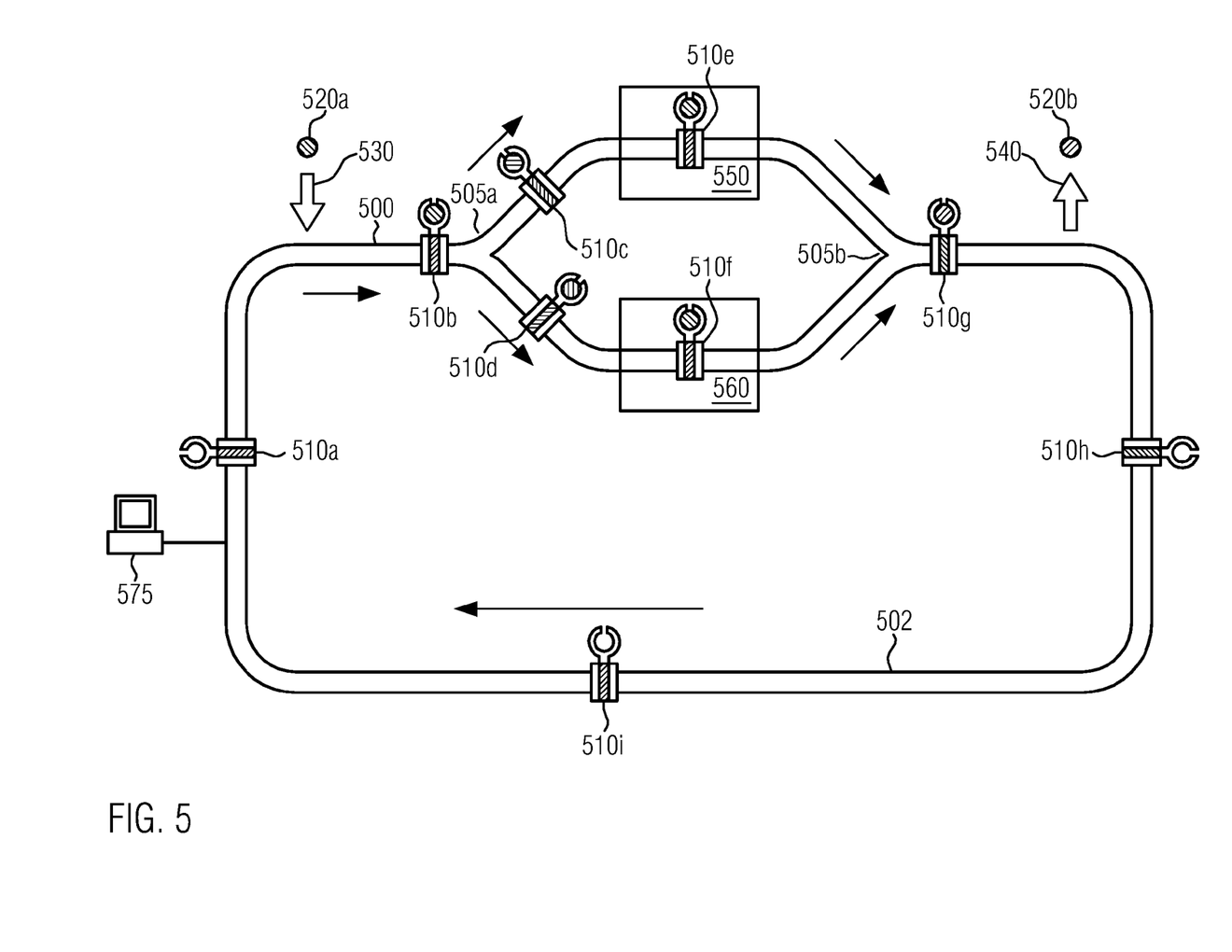
FIG. 5 represents a schematic diagram of an example of a transport device according to the present invention for the case in which the transport elements are via a first track switch supplied selectively to the first or the second container treatment unit and returned via a second track switch.

FIG. 5 represents a schematic diagram of an example of a transport device according to the present invention which realizes a configuration that is alternative to the selective supply of transport elements to the first or the second container treatment unit shown in FIG. 4. Unlike in FIG. 4, the configuration presently shown comprises a common return path 502 along which unloaded transport elements 510h and 510i are returned to receiving point 530. Transport track 500 therefore comprises two parallel branches between first track switch 505a and second track switch 505b along which first container treatment unit 550 and second container treatment unit 560 are arranged. An initially unloaded transport element 510a there receives container 520a at receiving point 530. Transport element 510b now being loaded supplies the container to first track switch 505a from where the container is depending on the position of the track switch by transport element 510c or 510d, respectively, supplied to the first or the second container treatment unit. Reference numerals 510e and 510f denote the respective transport element at the time of treatment of the container by the respective container treatment unit. Transport element 510g is from the first and the second container treatment unit via second track switch 505b guided to delivery point 540 where container 520b carried along is delivered. As repeatedly described above, the movement of the individual transport elements and the position of the track switches is controlled by programmable logic control unit 575 such that a backup of transport elements upstream of a slower or failed container treatment unit and a faster operating container treatment unit running empty can be prevented. This configuration as well can be operated in a fault-tolerant manner with regard to the failure of an individual container treatment unit.

Figure 6:
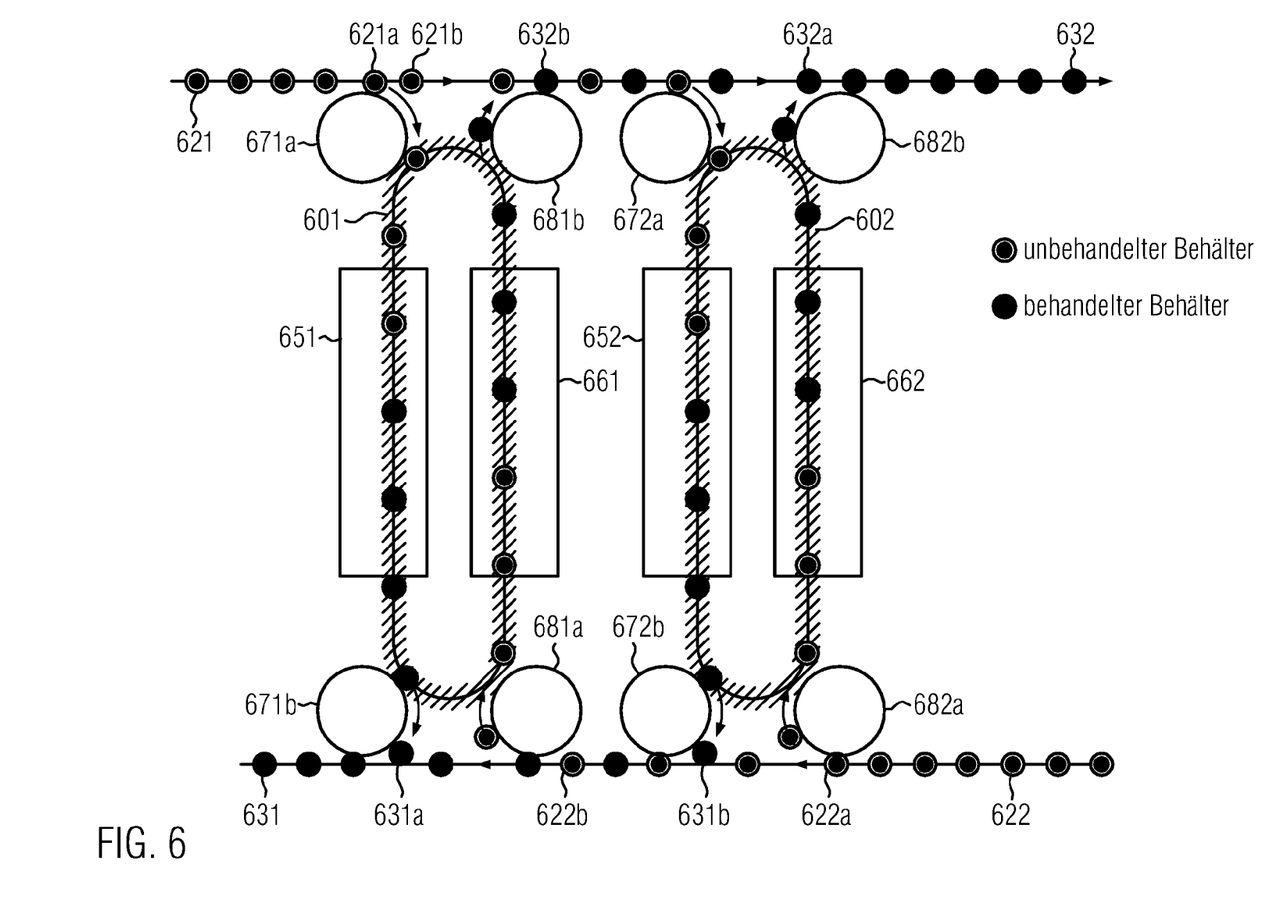
FIG. 6 represents a schematic diagram of a multiple arrangement of the transport device shown in FIG. 3.

FIG. 6 finally represents a schematic diagram of a multiple arrangement of the transport device shown in FIG. 3. The multiple arrangement shown comprises two autonomous units corresponding to the transport device illustrated in FIG. 3. The first unit there comprises a first feed conveyor 671a, a first removal conveyor 671B, a second feed conveyor 681a, a second removal conveyor 681b, a first container treatment unit 651, a second container treatment unit 661, and a first transport track 601. The second unit comprises a third feed conveyor 672a, a third removal conveyor 672b, a fourth feed conveyor 682a, a fourth removal conveyor 682b, a third container treatment unit 652, a fourth container treatment unit 662, and a second transport track 602. In the simplest case, the first to fourth container treatment units are configured as identical containers treatment units. In this case, gap treatment of the containers supplied along transport tracks 621 or 622, respectively, can be effected respectively via feed conveyors 671a and 672a or 681a and 682a, respectively. In this example, every second container 621a of third transport track 621 is by first feed conveyor 671a for treatment by first container treatment unit 651 transferred to the first unit, while remaining containers 621b are by third feed conveyor 672a for treatment by third container treatment unit 652 transferred to the second unit. Accordingly, every second container 622a of fourth transport track 622 is by fourth feed conveyor 682a for treatment by fourth container treatment unit 662 transferred to the second unit, while remaining containers 622b are by second feed conveyor 681a for treatment by second container treatment unit 661 transferred to the first unit. Now treated containers 631a and 631b or 632a and 632b, respectively, are by removal conveyor 671B and 672b or 681b and 682b, respectively, transferred to the respective other transport track.

The compensation path shown in FIG. 3 and the corresponding track switches are not shown in FIG. 6 for reasons of clarity, but can also be provided for the first and second units. A highly fault-tolerant container treatment system arises with the multiple arrangement illustrated. When using individually controllable transport elements for the two transport tracks 621 and 622, the system can be operated in a fault-tolerant manner with respect to the failure of up to three container treatment units. By controlling the conveying speeds of the feed conveyors and the removal conveyors and by individually controlling the transport elements, differences in the process time and/or the throughput of each container treatment units can also be compensated.

It is understood that the configurations shown in FIGS. 1 and 3 to 6 for container treatment systems with a first and a second container treatment unit can by adding appropriate process paths, track switches and/or compensation paths be extended to any number of redundantly operating container treatment units. The configurations shown can also be extended to include container treatment units for further process steps, where especially in the configuration shown in FIG. 5, a complete process chain can be constructed by replacing a section of the return path 502 with container treatment units connected in parallel for further process steps. The number of container treatment units connected in a redundant manner can vary depending on the process step. In addition, further compensation paths and/or bypass paths for improved control of the container treatment system are conceivable.

The invention claimed is:

1. A container treatment system which has a first container treatment unit for a process step and a second container treatment unit for said process step, and which has a transport device for transporting containers in the container treatment system, with
    at least one receiving point for containers,
    at least one delivery point for containers,
    a transport track which connects said at least one receiving point, said at least one delivery point, said first container treatment unit, and said second container treatment unit; and
    at least one transport element for transporting at least one container, said transport element being movably arranged on said transport track,
    where said transport track and said at least one transport element are designed such that said at least one transport element can be guided from a receiving point to a delivery point in an individually controllable manner; and
    drive means for supplying magnetic drive means to said transport element.

2. The container treatment system according to claim 1, where said transport device comprises a first receiving point and a second receiving point as well as a first delivery point and a second delivery point, where said transport track connects said first container treatment unit and said second container treatment unit in series, and where said transport track comprises:
    a first process path, which connects said first receiving point via said first container treatment unit to said first delivery point, and a return path for said transport element, where at least a section of said return path is formed as a second process path, which connects said second receiving point via said second container treatment unit to said second delivery point.

3. The container treatment system according to claim 2, where said transport track further comprises a compensation path connecting said first delivery point to said first receiving point and/or said second delivery point to said second receiving point.

4. The container treatment system according to claim 3, where at least a section of said compensation path is configured such that said transport element can be guided in either direction.

5. The container treatment system according to claim 1, where said first and said second container treatment unit are operated such that said transport element can be supplied selectively to said first or said second container treatment unit, and
    where said transport track comprises:
    a first transport path connecting said at least one receiving point via a first track switch to said first and said second container treatment unit, and a return path for said transport element.

6. The container treatment system according to claim 5, where said transport track further comprises a second transport path that connects said first and said second container treatment unit via a second track switch to said at least one delivery point.

7. The container treatment system according to claim 1, where said first container treatment unit comprises a first protection zone and said second container treatment unit a second protection zone separate from said first protection zone.

8. The container treatment system according to claim 1, where said transport element and at least a section of said transport track are formed such that said transport element can in the area of said section of said transport track be moved by way of magnetic force in interaction with said transport track.

9. The container treatment system according to claim 1, where said transport element is supported at the transport track one of fully magnetically, in part magnetically and in part mechanically, or fully mechanically.

10. The container treatment system according to claim 1, further comprising a control device for controlling said transport element.

11. The container treatment system according to claim 10, where said control device is configured to control said transport element in dependence of a first process time and/or a first throughput of said first container treatment unit and/or of a second process time and/or a second throughput of said second container treatment unit.

12. A method for transporting containers in a container treatment system which includes a first container treatment unit for a process step and a second container treatment unit for said process step, comprising:

receiving, in a transport element, at least one first container at a first receiving point for transporting containers, transporting said first container by way of said transport element along said transport track from said first receiving point to said first or second container treatment unit, transporting said first container by way of said transport element along said transport track from said first or said second container treatment unit to a first delivery point, said transport element delivering said first container at said first delivery point, and returning said transport element to said first receiving point, wherein said transport element is guided in an individually controlled manner from said receiving point to said delivery point.

13. The transport method according to claim 12, wherein said first and said second container treatment unit are arranged in parallel along said transport track, and wherein said first container is by way of said transport element supplied selectively to said first or said second container treatment unit.

14. The transport method according to claim 12, wherein said first container is transported from said first receiving point to said first container treatment unit, and where returning said transport element to said first receiving point comprises:

said transport element receiving at least one second container at a second receiving point, transporting said second container by way of said transport element along said transport track from said second receiving point to said second container treatment unit, transporting said second container by way of said transport element along said transport track from said second container treatment unit to a second delivery point, and said transport element delivering said second container at said second delivery point.

15. The transport method according to claim 14, where said transport element is in dependence of at least one of an operating state or a throughput of said second container treatment unit returned directly from said first delivery point to said first receiving point.

* * * * *